Feb. 20, 1962 R. R. WILLIAMSON ET AL 3,022,495

INFORMATION STORAGE SYSTEM

Filed Sept. 24, 1959 2 Sheets-Sheet 1

INVENTORS
ROBERT WILLIAMSON
ROBERT L. TERRY

BY [signature]

ATTORNEY

INFORMATION STORAGE SYSTEM
Filed Sept. 24, 1959 2 Sheets-Sheet 2
FIG. 6
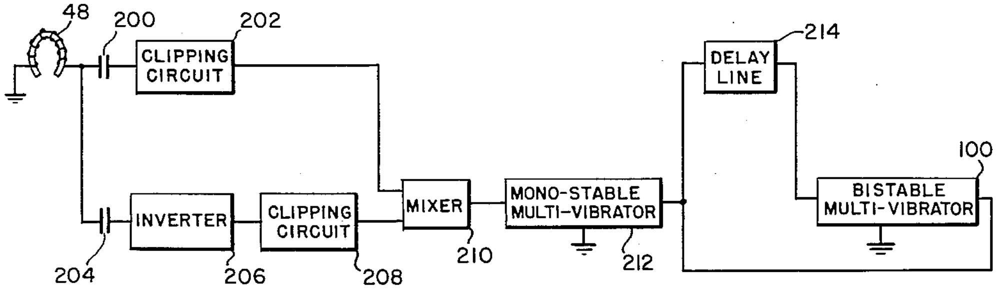
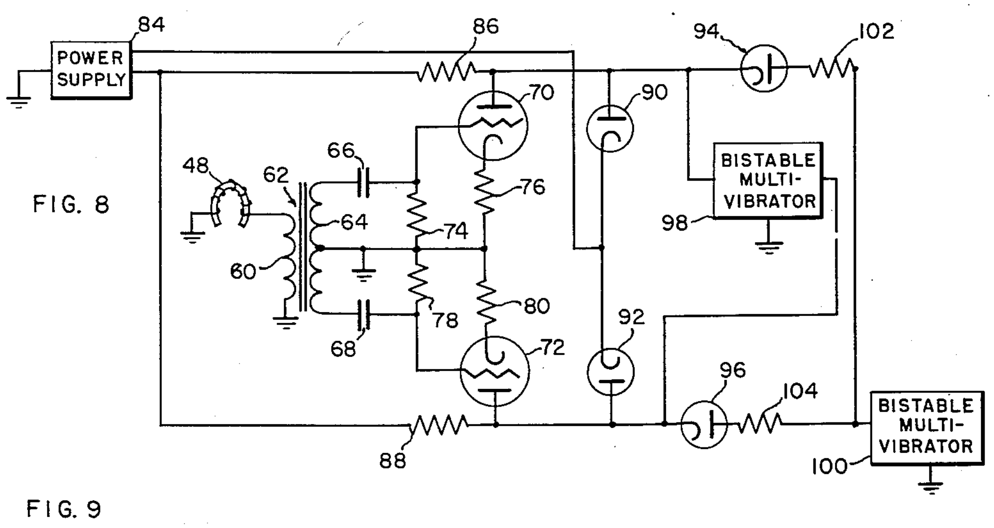
FIG. 9
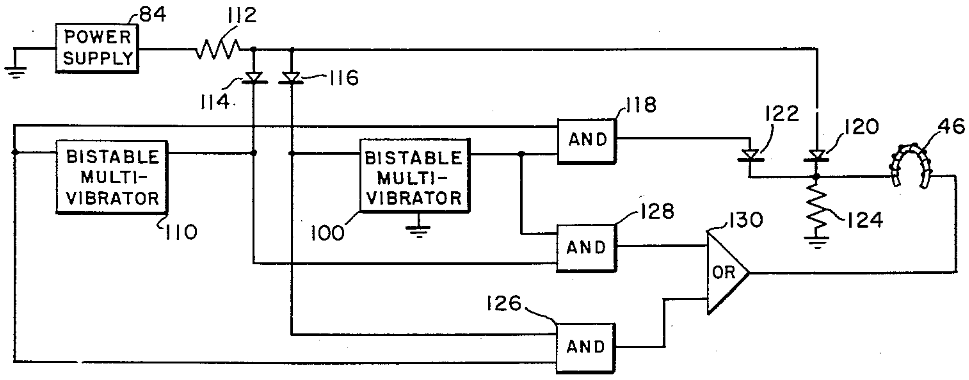
*INVENTORS*
ROBERT WILLIAMSON
ROBERT L. TERRY
*BY* [signature]
ATTORNEY 3,022,495

INFORMATION STORAGE SYSTEM

Robert R. Williamson, Tujunga, and Robert L. Terry, San Fernando, Calif., assignors to General Precision, Inc., a corporation of Delaware Filed Sept. 24, 1959, Ser. No. 842,157
9 Claims. (Cl. 340—174.1)

This invention is a continuation-in-part of our application Serial No. 524,056, filed July 25, 1955, and now abandoned, entitled "Information Storage System," and relates to systems for storing and subsequently reading magnetic information and more particularly to systems for providing a synchronized recording of magnetic information and a synchronized reading of the information at a later time. The invention is especially adapted to be used in electronic computers and data processing systems to produce a simplified and reliable system for storing information and subsequently presenting it for use.

In recent years, electronic computers and data reduction systems have been adopted for a wide variety of uses. Most of these computers and data processing systems operate on digital principles since high accuracy of computation can be obtained by the proper use of digital techniques. In digital computers, numerical values are represented by pluralities of signals. Each signal has first characteristics to represent a value of "1" or a "true" state and second characteristics to represent a value of "0" or a "false" state. In this way, complex numbers can be represented by different combinations of signals. For example, a decimal value such as "49" can be represented in binary form by a plurality of signals having a configuration of 110001, where the least significant digit is at the right.

In order for a computer or data processing system to operate properly, complex numbers have had to be stored during computation for subsequent use. To obtain such storage, magnetic memory members such as drums have often been used. The drums are provided on their periphery with a plurality of channels, each adapted to retain a plurality of bits of information. The different bits of information for each channel are recorded magnetically in successive positions in the channel by a "record" head associated with the channel. The information is recorded in successive positions as the drum rotates the positions past the head. The magnetic information is retained in the different positions on the drum because of the characteristics of the magnetic material on the drum. Further rotation of the drum causes the magnetic information in the different positions to move past "read" heads, which have induced in them electrical signals corresponding to the magnetic information in these positions. The electrical signals induced in the "read" coils are used in the subsequent computations.

Since a plurality of channels are often provided on the magnetic drum, synchronization in the recording of information in the different channels must be provided. This has been obtained until now by providing a separate channel commonly designated as the "clock" channel and by producing cyclic signals in an associated "read" coil as the drum rotates. The clock channel produces a signal for each position in the adjacent channels to control the recording and reading of magnetic information in each channel only at a particular time in each cycle. Such a method is somewhat disadvantageous since an additional channel and an additional "read" coil and associated circuitry are required.

There are other disadvantages to the system of recording and reading now in use. One disadvantage is that the adjacent bits or positions in each channel are not completely isolated from one another. Because of this, the magnetic information being recorded in a particular position affects the information recorded in adjacent positions. As a result, signals which are somewhat blurred are recorded in the magnetic drum.

Since the recorded signals are somewhat blurred, they do not have the sharp wave form and the signal intensity which might normally be desired. In this way errors may be produced in the production of electrical signals by the "read" head. This is especially true since the "read" head introduces further complications by its failure to see the magnetic information in only one pulse position at a time. Because of these complications, the maximum speed for presenting successive pulse positions on a drum for computation is somewhat limited.

This invention provides apparatus for overcoming the above disadvantages. The apparatus is intended to be used in a digital computer, or in a data processing system. It includes a magnetic drum having at least one channel which is provided with cut-out and filled portions separated by non-cut-out and non-filled portions in a particular pattern. The cut-out and filled portions are provided with magnetic characteristics so that signals are induced in the coil of a "read" head as the portions move past the "read" head. These signals represent digital information which is to be used in computation by the computer, or data processing system. The signals may be also utilized to generate clock signals, such clock signals being generated by electrical circuitry associated with the "read" head. In this way the drum and its associated circuitry combines the function of an information channel and a clock channel.

By utilizing a notched periphery on the drum, signals are produced which are more sharp and distinct than the signals produced by a magentic drum having separate clock and information channels. Providing channels with notched peripheries also gives other advantages. For example, permanent patterns of information representing such parameters as the initial conditions in the solution of a problem can be built into a channel by proper placement of the notches. Such permanent patterns can be recovered by subjecting all of the cut-out and filled portions in the channel to magnetic flux of a unidirectional polarity.

In the drawings:

FIGURE 6 is a circuit diagram, essentially in block form, somewhat schematically illustrating how clock signals may be produced from the signals shown in FIGURES 3 and 5;

FIGURE 8 is a circuit diagram, partly in block form, somewhat schematically illustrating how the signals produced by the information channels may be combined with the clock signals produced by the circuit shown in FIGURE 6 to control the production of electrical signals by a "read" head in accordance with the pattern of magnetic signals in an information channel; and FIGURE 9 is a circuit diagram, partly in block form illustrating how magnetic signals are produced in an information channel by a "record" coil in accordance with the pattern of electrical signals introduced to the circuit.

Figures 1, 2:
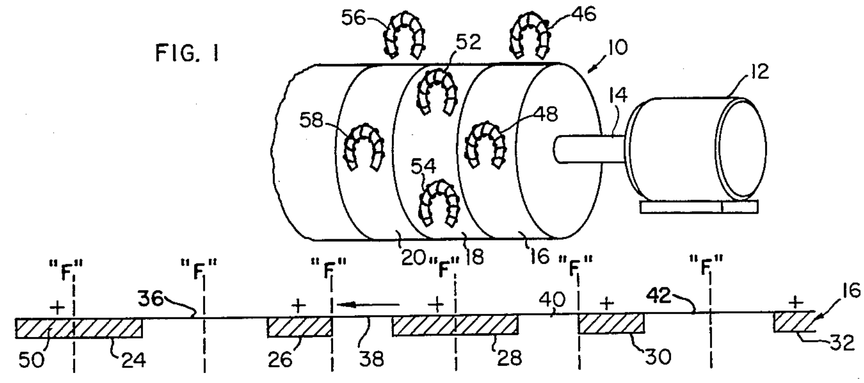
FIGURE 1 is a perspective view of one embodiment of the invention including a magnetic drum having a plurality of channels, "read" and "record" heads associated with the drum and a motor for driving the drum.
FIGURE 2 is an enlarged fragmentary view of a portion of one of the channels shown in FIGURE 1 and illustrates in a planar view a plurality of non-cut-out and non-filled and cut-out and filled portions in the channel, in which all of the cut-out and filled portions are polarized with magnetic flux in one direction.

In the embodiment of the invention shown in the drawings, a magnetic drum generally indicated at 10 in FIGURE 1 may be made from a non-magnetic material, such as aluminum, or a suitable plastic material. The magnetic drum 10 may have a suitable diameter, such as approximately 8 inches, and a suitable axial length, such as approximately 4 or 5 inches. The drum is adapted to be driven by a motor 12 through a shaft 14. The drum may be either directly driven or driven by a belt or gears. Actually, the drum may stand still and reading or recording members may move around the drum. This movement is preferably rotational, but it may also be linear, or in any other suitable form. Reading and recording members will be described in detail subsequently.

The drum 10 may be considered as being divided into a plurality of channels, such as channels 16, 18 and 20 in FIGURE 1. Each channel extends in a closed annular loop around the periphery of the drum and carries patterns of magnetic signals on its periphery to represent different information, such as digital information. For example, when the drum has a periphery of approximately 8 inches, it may carry more than 2500 different bits of magnetic information in each channel. Furthermore, when the drum has an axial length of approximately 5 inches, it may have more than a dozen channels, each separated from the adjacent channels by a distance of approximately ¼ inch to isolate it magnetically from the adjacent channels.

Each channel has a plurality of cut-out and filled portions separated by non cut-out and non filled portions which, for the sake of clarity and simplicity, shall hereinafter be referred to simply as filled and non-filled portions extending in the annular direction around its periphery. For example, a portion of the channel 16 is shown in enlarged fragmentary form in FIGURES 2 and 4. The fragment of the channel 16 shown in FIGURES 2 and 4, includes a plurality of filled portions 24, 26, 28, 30 and 32. The portions 24, 26, 28, 30 and 32 are respectively separated from one another by non-filled portions 36, 38, 40 and 42 it will be appreciated that the non-filled portions 36, 38, 40 and 42 are non-magnetic or diamagnetic inasmuch as the drum 10 is made of aluminum or the like.

The filled portions 24 and 28 have annular lengths approximately twice as great as the filled portions 26 and 30. The annular lengths of the filled portions 24 and 28 may be approximately equal to the annular length of one pulse position on the channel 16. For example, when the drum has a diameter of approximately 8 inches and a concentration of 2500 information bits per channel, the filled portions 24 and 28 may have annular lengths of approximately 0.01 inch. The non-filled portions 36 and 42 may have lengths approximately equal to the filled portions 24 and 28 and approximately twice as great as the lengths of the non-filled portions 38 and 40.

The non-filled portions 36, 38, 40 and 42 are above the filled portions 24, 26, 28, 30 and 32 by a suitable distance such as a few thousandths of an inch.

The filled portions 24, 26, 28, 30 and 42 are preferably filled to the level of the non-filled portions with a suitable magnetic material. One manner of applying this coating which has been found quite suitable is to spray coat the entire drum until the cut-out portions are completely filled and then mill the excess material from the non-filled portions until the non-magnetic substance of the drum is completely exposed. The remaining coating is indicated at 50 in FIGURES 2 and 4. The coating 50 is adapted to retain magnetic flux from one or both of the heads 46 and 48. The coating 50 may be considered as "ferromagnetic" or paramagnetic because of its properties of magnetic retentivity, even though it need not necessarily be made from an iron material or compound. The coating 50 should be applied with a uniform thickness into all of the cut-out portions in the drum. This thickness may be as little as one or two thousandths of an inch thick.

As described above, the transducing heads 46 and 48 are disposed in magnetic proximity to the filled surface of the magnetic material in the filled portions in the channel 16, such as the portions 24, 26, 28, 30 and 32. The heads 46 and 48 are illustrated schematically in FIGURE 1.

The heads 46 and 48 are separated from the surface of the drum in the channel 16 by a relatively short distance, such as a few thousandths of an inch, so as to provide an optimum magnetic coupling with the magnetic material in the filled portions.

Each of the heads 46 and 48 includes a coil for providing a transducing action between the occurrence of magnetic signals in the channel 16 and the production of corresponding electrical signals in the coil. For example, the head 46 may perform a "recording" function by receiving electrical signals from a digital computer or data processing system and by converting these electrical signals into corresponding patterns of magnetic signals in the channel 16. This is accomplished as the drum 10 rotates to move successive filled portions in the channel 16 past the head 46. Similarly, the head 48 may serve as a "read" head by converting the magnetic signals in the channel 16 into a corresponding pattern of electrical signals in the head.

The other channels on the drum 10 are cut-out and filled in a manner similar to that described above for the channel 16. The particular pattern of the cut-out and filled portions in each channel may be ascertained from the subsequent discussion. Transducing heads are also associated with each channel in a manner similar to the association between the channel 16 and the heads 46 and 48, as described above. For example, transducing heads 52 and 54 may be associated with the channel 18 and transducing heads 56 and 58 may be similarly associated with the channel 20.

Figure 4:
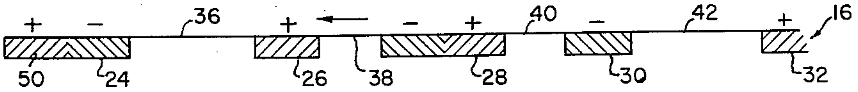
FIGURE 4 is an enlarged fragmentary view similar to that shown in FIGURE 2, but illustrates how the cut-out and filled portions may be polarized with magnetic flux in two opposite directions to produce any pattern of signals desired.

The magnetic drum described above is adapted to be used with the system shown in FIGURE 8 to produce electrical signals in accordance with the pattern of magnetic signals previously recorded in an associated information channel, such as the channel 16 in FIGURES 1, 2 and 4. The circuit shown in FIGURE 8 includes the "read" head 48 also shown in FIGURE 1. One terminal of the head 48 is grounded, as is one terminal of a primary winding 60. The other terminal of the head 48 and the primary winding 60 are connected to each other.

The primary winding 60 forms a part of a transformer generally indicated at 62. The transformer 62 also has a secondary winding 64 which is center tapped to ground. The end terminals of the secondary winding 64 are respectively connected through coupling capacitances 66 and 68 to the grids of tubes 70 and 72. The grid of the tube 70 is in series with the cathode of the tube through resistances 74 and 76. Similarly, the grid of the tube 72 and the cathode of the tube are in series through resistances 78 and 80. The resistances 74 and 78 have a common terminal, as do the resistances 76 and 80. The tube 70 and the resistances 74 and 76 respectively have parameters similar to the tube 72 and the resistances 78 and 80. The common terminal between the resistances 74, 76, 78 and 80 is grounded.

The plates of the tubes 70 and 72 receive positive direct voltages from a power supply 84 through resistances 86 and 88, respectively, which have substantially equal values. The plates of the tubes 70 and 72 are also respectively connected to the plates of diodes 90 and 92, the cathodes of which may be connected to receive a suitable voltage of positive polarity. Connections are also made from the plates of the tubes 70 and 72 to the cathodes of diodes 94 and 96, respectively, and to the left and right input terminals in a bistable multivibrator 98. The plates of the diodes 94 and 96 receive signals from the left output terminal in a bistable multivibrator 100 through resistances 102 and 104, respectively. The multivibrators 98 and 100 may be constructed in a manner similar to that described on pages 164 to 166, inclusive, of volume 19, entitled "Waveforms," of the Radiation Laboratory Series published by the Massachusetts Institute of Technology in 1949.

Just as the circuit shown in FIGURE 8 produces electrical signals in accordance with the pattern of electrical signals in a channel, such as the channel 16 in FIGURE 1, the circuit shown in FIGURE 9 converts electrical signals into a corresponding pattern of magnetic signals in the channel. The circuit shown in FIGURE 9 includes the bistable multivibrator 100 and the power supply 84 shown in FIGURE 8. It also includes a bistable multivibrator 110 for supplying electrical signals to be recorded in an information channel such as the channel 16 in FIGURE 1.

The power supply 84 is connected through a resistance 112 to the plates of diodes 114 and 116. The cathodes of the diodes 114 and 116 are respectively connected to the right output terminal in the multivibrator 110 and the left output terminal in the multivibrator 100. The resistance 112 and the diodes 114 and 116 form an "and" network, as will be described in detail subsequently.

Connections are made from the right output terminal in the multivibrator 100 and the left output terminal in the multivibrator 110 to the input terminals of an "and" network 118. The "and" network 118 corresponds to that formed by the resistance 112 and the diodes 114 and 116. The plates of the diodes 114 and 116 are connected to the plate of the diode 120, and the output terminal of the "and" network 118 is connected to the plate of a diode 122. The cathodes of the diodes 120 and 122 have a common connection with a suitable terminal of the "record" head 46 and with one terminal of a resistance 124, the other terminal of which is grounded. The diodes 120 and 122 and the resistance 124 form an "or" network, as will be described in detail subsequently.

The voltages on the left output terminals in the multivibrators 100 and 110 are introduced to an "and" network 126. Similarly, the input terminals of an "and" network 128 receive voltages from the right output terminals in the multivibrators 100 and 110. The "and" networks 126 and 128 correspond to the "and" network formed by the resistance 112 and the diodes 114 and 116. The signals from the "and" networks 126 and 128 are in turn introduced to input terminals of an "or" network 130 corresponding to that formed by the diodes 120 and 122 and the resistance 124. The output terminal of the "or" network 130 is connected to a suitable terminal of the record head 46.

The magnetic drum and associated circuitry described above are especially adapted to be used with the "Ferranti" system of reading and recording magnetic signals. In the Ferranti system an information channel, such as the channel 16, receives a change of magnetic polarization at a particular position in the annular length defining a pulse bit. Preferably, this change in magnetic polarization occurs at an intermediate position in the length defining a pulse bit, such as at a position halfway between the boundaries of each pulse bit, the boundaries of each such pulse bit are, for the purpose only of clarification of the "Ferranti" sylstem referred to above, indicated, in FIGURE 2, by vertical dashed lines designated by the letter "F."

In the Ferranti system, when a digital indication of "1" is to be recorded in a pulse position, the magnetic polarization changes from a negative direction to a positive direction midway through the pulse position. Similarly, the magnetic polarization changes from a positive direction to an negative direction midway through each pulse position when a "0" is to be recorded. The operation of the Ferranti system may be seen from FIGURES 2 and 3. For example, the boundary between the filled portion 24 and the raised portion 36 indicates a digital value of "0" for a pulse position when the filled portion 24 carries magnetic flux of a positive polarity.

The reason is that the boundary occurs midway through the pulse position and represents a change from a positive magnetic polarization in the filled portion 24 to no effective magnetism in the non-filled portion 36. Similarly, at the intermediate position in the next pulse bit, a change in magnetism occurs at the boundary between the non-filled portion 36 and the filled portion 26. This change represents a digital indication of "1" when magnetic flux having a positive polarity is stored in the magnetic material 50 of the filled portion 26. The reason is that the flux changes from a zero level to a positive level at the boundary between the portions 26 and 36.

Since there is a change from a filled portion to a non-filled portion, or vice versa, midway between the boundaries of each pulse position in a channel, a signal is induced in the "read" head associated with the channel at an intermediate position in each pulse bit. A signal is induced in the "read" head at an intermediate position in each pulse bit because of the change in the flux level at this position. A positive signal is induced when the change is from a non-filled portion to a filled portion having a magnetic flux of a positive polarity. This may be seen by a signal 150 in FIGURE 3, the signal being induced in the "read" head 48 upon the movement past the read head of the boundary between the non-filled portion 36 and the filled portion 26.

Figure 5:
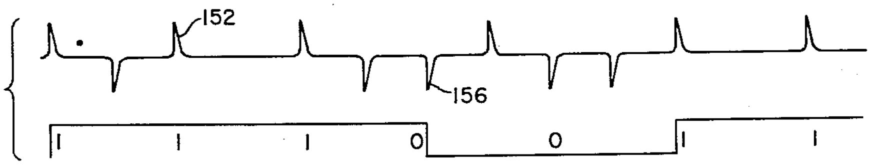
FIGURE 5 shows curves illustrating the pattern of signals produced by the cut-out and filled portions in FIGURE 4 when these portions are polarized in a manner similar to that shown in FIGURE 4.

In like manner, a positive signal is induced in a "read" head when a filled portion having a negative polarization is followed by a non-filled portion. For example, a positive signal 152, FIGURE 5, is induced in the read head 48 at the boundary between the filled portion 24 and the non-filled portion 36 in FIGURE 4. As will be seen in FIGURES 2 and 4, flux of a positive polarity is represented by shading upwardly and to the right, and flux of a negative polarity is represented by shading upwardly and to the left.

Signals of negative polarity are induced in a "read" head such as the head 48 when a filled portion having a positive polarity of magnetization is followed by a non-filled portion. By way of illustration, a negative signal 154 is obtained in FIGURE 3 when the boundary between the filled portion 24 and the non-filled portion 36 in FIGURE 2 moves past the "read" head 48.

Similarly, negative signals are induced in a "read" head, such as the head 48, when a non-filled portion is followed by a filled portion having a negative polarity. This may be seen from an example in FIGURE 4 and is illustrated by a signal 156 in FIGURE 5. As will be seen, the signal 156 is produced when the boundary between the non-filled portion 38 and the filled portion 28 moves past the "read" head 48.

When a positive signal is induced in a "read" head at a position midway between the boundaries defining a pulse bit, it causes a positive signal to be produced at a first output terminal until a corresponding position in the next pulse bit. This may be seen from a specific example, such as the effect of the signal 150 in FIGURE 3 on the circuit shown in FIGURE 8. This signal causes a positive current to flow through the primary winding 60 of the transformer 62 such that a secondary voltage is induced in the secondary winding 64.

The positive voltage induced in the secondary winding 64 causes a positive signal to be introduced through the coupling capacitance 66 to the grid of the tube 70. This signal causes the tube 70 to become conductive and produces a flow of current through a circuit including the power supply 84, the resistance 86, the tube 70 and the resistance 76. The current flowing through the resistance 86 produces a voltage drop across the resistance whereby a negative signal is obtained on the plate of the tube 70. The current also produces a voltage drop across the resistance 76. This causes a negative feedback signal to be applied to the grid of the tube 70. This negative feedback signal is in opposition to the positive signal from the transformer 62 and is instrumental in producing stability in the operation of the circuit.

The negative signal on the plate of the tube 70 is not absorbed by the diode 90. The reason is that the voltage on the plate of the diode 90 becomes negative relative to the potential on the cathode of the diode and prevents current from flowing through the diode, especially when a positive potential exists on the cathode of the diode. In this way, the negative signal produced on the plate of the tube 70 is introduced to the cathode of the diode 94. The production of a negative signal and the introduction of this signal to the cathode of the diode 94 may be facilitated by providing a capacitance between the plates of the diodes 70 and 90. During the time that a positive potential is introduced to the plate of the diode 94, the negative signal on the cathode of the diode is neutralized by the positive potential on the diode plate. Because of this, no signal can be introduced to the grid of the left tube in the multivibrator 98.

The voltage on the plate of the diode 98 is controlled by the voltage on the left output terminal in the multivibrator 100. As will be described in detail subsequently, the multivibrator 100 is adapted to provide cyclic signals at a regular frequency. This frequency is coordinated with the rate at which successive pulse positions in the information channels of the drum 10 move past their associated "read" heads. The recurrent signals produced by the multivibrator 100 are illustrated at 160 in FIGURE 7. The signals may be produced either by a separate clock channel on the drum 10, or preferably by the circuitry shown in FIGURE 6 and constituting a part of this invention.

As will be seen in FIGURE 8, the clock signal on the left output terminal in the multivibrator 100 swings downwardly at substantially the middle position between the boundaries of each pulse bit. At such times a negative signal is introduced from the left output terminal in the multivibrator 100 to the plate of the diode 94. This negative signal prevents current from flowing through the diode 94 so that the negative signal on the cathode of the diode is introduced to the left input terminal in the multivibrator 98.

The negative signal passing to the left input terminal in the multivibrator 98 triggers the tube into a state of nonconductivity. This causes a relatively high voltage to be produced on the left output terminal in the multivibrator 98, as indicated at 154 in FIGURE 3. At the same time, the right tube in the multivibrator 98 becomes conductive in accordance with the normal operation of bistable multivibrators.

When a positive voltage is induced in the "read" head 48 it causes a positive signal to be introduced to the grid of the tube 70 as described above. Because of the action of the center-tapped winding 62, the positive signal induced in the read head 48 causes a negative signal to be introduced to the grid of the tube 72. If the tube 72 should be at all conductive, the negative signal would tend to cut off the tube so as to produce a positive signal on the plate of the tube. This positive signal is absorbed by the diode 92 since it produces a flow of current through the diode to ground. In this way, the positive signal cannot pass to the multivibrator 98 to affect the operation of the multivibrator.

Figure 3:
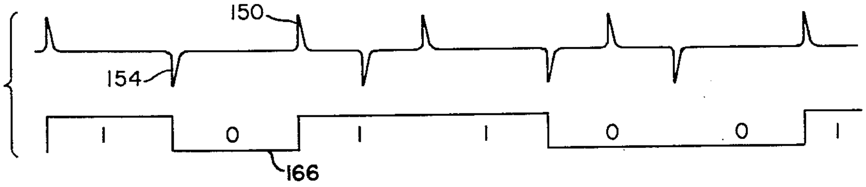
FIG.3 shows curves illustrating the pattern of signals produced by the cut-out and filled portions in FIGURE 2 when these portions are polarized with magnetic flux in one direction, as shown in FIGURE 2.

A negative signal induced in the head 48 such as the signal 154 in FIGURE 3 causes a negative signal to be introduced to the grid of the tube 70 in FIGURE 8 and a positive signal to be introduced to the grid of the tube 72. The negative signal on the grid of the tube 70 produces a positive signal on the plate of the tube in a manner similar to that described above. This signal cannot pass beyond the plate of the diode 90 because of the flow of current through the diode to the positive terminal at the cathode of the diode. In this way, the operation of the bistable multivibrator 98 is not affected in any way.

The positive signal on the grid of the tube 72 produces a negative signal on the plate of the tube in a manner similar to that described above. This signal is not absorbed by the diode 92 since it biases the plate of the diode with a negative potential relative to the positve potential on the cathode of the diode so as to prevent the flow of current through the diode. This causes the signal to be introduced to the cathode of the diode 96. During the time that a positive signal is introduced to the plate of the diode 96, the negative signal on the cathode of the diode is neutralized so that no triggering signal can pass to the multivibrator 98.

At the time that the clock signal from the multivibrator 100 changes from a high value to a low value, a signal of low amplitude is introduced to the plate of the diode 96. This causes the negative signal on the cathode of the diode 96 to pass to the right input terminal in the multivibrator 98. The signal triggers the right tube in the multivibrator 98 into a state of non-conductivity such that a relatively high voltage is produced on the right output terminal in the multivibrator and a relatively low voltage is produced on the left output terminal in the multivibrator. The low voltage on the left output terminal in the multivibrator 98 is illustrated at 166 in FIGURE 3.

From the above discussion, it may be seen that a fixed pattern of signals will be produced in an output stage such as the multivibrator 98 in FIGURE 8 when all of the filled portions in the channel are polarized in the same direction. For example, the fragment of the channel 16 shown in FIGURE 2 produces a fixed pattern when the filled portions 24, 26, 28, 30 and 32 are moved to the left past the read head 48, when the boundaries of each bit occur intermediate the change of magnetization point used by the Ferranti system. This pattern is represented by successive indications of 1001101, where the least significant digit is at the right. This is equivalent in binary form to a decimal value of "77."

Since a fixed pattern of signals is produced in a channel upon a unidirectional magnetic polarization of the filled portions in the channel, the fixed pattern can be made to represent any value desired by controlling the pattern in which the filled and non-filled portions are formed in the channel. This provides advantages in the solution of many problems in digital computers and data processing systems. For example, the fixed pattern of signals in a channel represented by a unidirectional magnetic polarization may indicate various initial conditions in the solution of a problem.

In case a solution of a mathematical problem has to be repeated, the initial conditions may be instantaneously recaptured by magnetically polarizing the filled portions in a single direction. This may be accomplished by rotating the drum through at least one revolution and during this time applying a direct voltage of positive polarity to the "record" head, such as the head 46. This avoids the necessity of programming the initial conditions into the digital computer or data processing system and often involves a considerable saving of time. By way of example, this may be important in the mass production of such items as cams, each of which must be cut in an identical pattern.

After initial conditions of fixed magnitudes have been obtained by unidirectionally polarizing the filled portions in the different channels, the computation may proceed on a normal basis. This is so even though the filled portions such as the portions 24, 26, 28, 30 and 32 are interrupted by the non-filled portions, such as the portions 36, 38, 40 and 42. For example, the filled portions or fragments of the channel 16 shown in FIGURE 2 can be polarized to obtain any pattern of signals desired. This may be seen from the pattern of polarization shown in FIGURE 4, where shading upwardly and to the right represents a positive magnetic polarization and shading upwardly and to the left represents a negative magnetic polarization.

In the examples shown in FIGURE 4, the filled portion 26, the first halves of the filled portions 24 and 32, and the second half of the filled portion 28 are provided with magnetic flux of a positive polarity. The filled portion 30, the first half of the filled portion 28, and the second half of the filled portion 24 are provided with magnetic flux of a negative polarity. This causes a particular pattern of signals to be induced in the "read" head 48, as shown in the first horizontal column of FIGURE 5.

The pattern of signals induced in the "read" head 48 in turn causes a pattern of signals illustrated in the second column of FIGURE 5 to be produced on the left output terminal in the multivibrator 98. The signals are produced on the left output terminal in the multivibrator 98 in a manner similar to that described previously. The pattern of signals shown in the second column of FIGURE 5 represents a digital sequence of 1100111, where the least significant digit is at the right. This is equivalent in binary form to a decimal value of "103."

Different patterns of signals such as that shown in FIGURE 4 may be recorded in the information channels by circuitry similar to that shown in FIGURE 9. When the circuit shown in FIGURE 9 is used, magnetic signals are recorded in a Ferranti pattern in the various channels, such as the channel 16. The characteristics of a Ferranti pattern have been described in detail previously.

The pattern of signals recorded in a channel such as the channel 16 is controlled by the operation of an information member such as the bistable multivibrator 110 and by the operation of a cock source such as the bistable multivibrator 100. For example, when relatively high voltages are simultaneously produced on the left output terminal in the multivibrator 100 and the right output terminal in the multivibrator 110, the cathodes of the diodes 116 and 114 have high voltages introduced at the same time to them.

The high voltages on the cathodes of the diodes 114 and 116 prevent current from flowing through a circuit including the power supply 84, the resistance 112 and the diodes. This causes a high voltage to be produced on the plates of the diodes 114 and 116. The high voltage on the plates of the diodes 114 and 116 is introduced to the plate of the diode 120 to produce a flow of current through the diode and the resistance 124. This causes a relatively high voltage to be produced across the resistance 124 for introduction to the "record" head 46. The voltage is introduced to the "record" head 46 in a manner to produce a recordation of positive flux in the channel 16.

Figure 7:
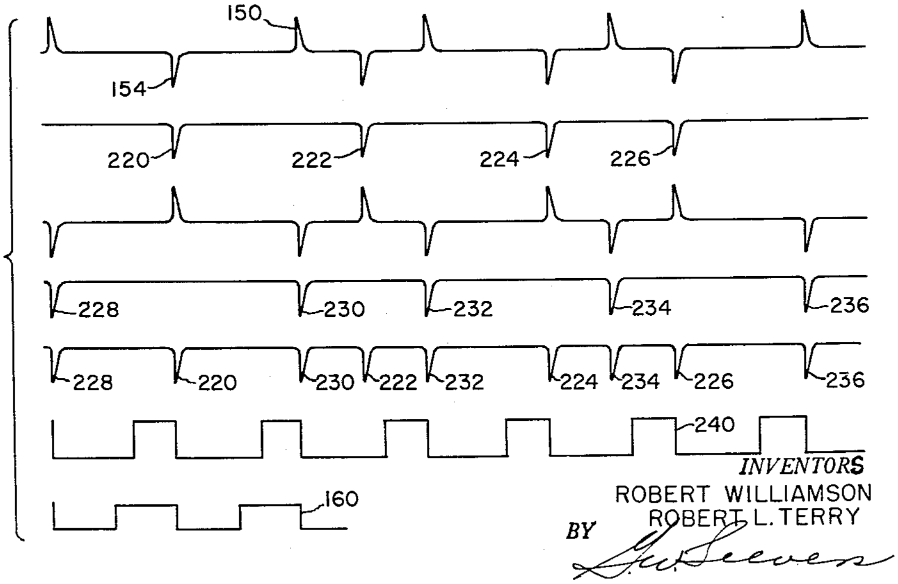
FIGURE 7 shows curves illustrating the operation of the circuit shown in FIGURE 6 in converting into clock signals the signals produced by the channel portion shown in FIGURE 2 and indicated in FIGURE 3.

Within a half cycle, the voltage on the left output terminal in the multivibrator 100 becomes low, as illustrated at 160 in FIGURE 7 and described fully above. This voltage is introduced to the cathode of the diode 116 to produce a flow of current through a circuit including the power supply 84, the resistance 112 and the diode. The resultant voltage produced across the resistance 112 causes a voltage drop to be produced on the plates of the diodes 114 and 116.

Because of the voltage drop on the plates of the diodes 114 and 116, current is no longer able to flow through the diode 120 and the resistance 124. This causes the voltage on the cathode of the diode 120 to drop from a positive value to a ground potential. In this way, current is no longer able to flow through the "record" head 46 to produce a positive flux in the channel 16.

Positive flux is also produced by the "record" head 46 when relatively high voltages are simultaneously produced on the left output terminal of the information multivibrator 110 and the right output terminal of the clock multivibrator 100. The simultaneous occurrence of these signals causes a signal to pass through the "and" network 118. The signal produces a high voltage on the plate of the diode 122 and is instrumental in producing a flow of current through the diode 122 and the resistance 124. The resultant voltage of positive polarity produced across the resistance 124 causes the head 46 to record magnetic flux of positive polarity in the raised portions of the channel 16.

Positive flux is produced in a channel such as the channel 16 in accordance with the logical equation:

$$U=FT_2+\overline{F}T_1 \qquad (1)$$

where $U$=the production of a positive voltage across the resistance 124 to obtain the recordation of positive flux in the channel 16;

$F$=a relatively high voltage on the left output terminal in the multivibrator 110;

$\overline{F}$=a relatively high voltage on the right output terminal in the multivibrator 110;

$T_1$=one-half of each clock cycle as represented by a relatively high voltage on the left output terminal in the multivibrator 100;

$T_2$=the other half of each clock cycle, as represented by a relatively high voltage on the right output terminal in the multivibrator 100.

The "+" sign in Equation 1 indicates an "or" proposition in which "U" is true when either "$FT_2$" or "$\overline{F}T_1$" is true.

In like manner, magnetic fluxes of negative polarity are recorded by the head 46 in the channel 16 when signals pass through either the "and" network 126 or the "and" network 128. When signals pass through either the "and" network 126 or the "and" network 128, they pass through the "or" network 130 to the head 46 for recordation in the channel 16. Signals pass through the stages 126, 128 and 130 in accordance with the logical equation:

$$D=FT_1+\overline{F}T_2 \qquad (2)$$

where $D$=the introduction of a signal to the head 46 from the "or" network 130 to record magnetic signals of negative polarity in the channel 16; and the other terms have previously been defined.

The apparatus described above has certain important advantages. By providing cut-out and filled portions for each channel, volatile information of any pattern can be recorded in the channel. This can be seen from a comparison of the magnetic patterns in the channel fragment shown in FIGURES 2 and 4 and from the above discussion. Furthermore, fixed information representing such values as initial conditions can be recorded by magnetizing the magnetic material in the filled portions in a channel with a unidirectional polarization. The fixed information cannot be destroyed even by stray magnetic fields or by a power failure. The reason is that the information can be restored merely by applying a unidirectional current to a record head such as the head 46 during a single revolution of the drum 10.

The apparatus described above has other important advantages. By providing filled portions such as the portions 24, 26, 28, 30 and 32 and depressed portions such as the portions 36, 38, 40 and 42, sharp boundaries are produced between the successive filled and nonfilled portions. These sharp boundaries are instrumental in enhancing the sharpness and amplitude of any signals induced in a "read" head such as the head 48 upon the movement of the successive portions past the head. The reason is that the sharpness and amplitude of the induced signals are dependent upon the rate at which the magnetic flux changes. As will be seen, the rate of change of magnetic flux at the boundary between a filled portion and a non filled portion is relatively high. By enhancing the sharpness and amplitude of the induced signals, the proper operation of such stages as bistable multivibrators is insured.

Providing sharp boundaries between successive filled and depressed portions offers further advantages. It prevents or it minimizes any blurring of signals such as may sometimes be produced in a magnetic drum in which each channel has a continuous annular periphery. Blurring of signals is obtained in channels having continuous annular peripheries because of the tendency of a signal magnetically recorded in one pulse position to spill over into the fringes of adjacent positions. For example, when magnetic flux of positive polarity is recorded in one pulse position and is bounded by magnetic fluxes of negative polarity in the adjacent positions, the positive flux appears at the fringes of the adjacent positions. This causes the intensity of the negative flux in the adjacent positions to be weakened so that relatively weak signals are induced in the associated "read" head such as the head 48. This may sometimes produce an improper operation in a digital computer or data processing system. By providing sharp boundaries between successive raised and depressed portions, any tendency towards blurring is minimized.

Since blurring is prevented or at least minimized, successive pulse positions can be positioned closer together than in the drums now in use. For a given speed of drum rotation, a closer packing of pulse positions produces an increase in the rate at which successive pulse positions are presented to the "read" and "record" heads. This increase in the rate of pulse presentation in turn produces an increase in the speed of computation. Since the magnetic drum at present is the component mainly limiting the speed of computation in digital computers and data processing systems, any increase in the rate of pulse presentation in the magnetic drum can be of great importance.

It should be appreciated that the increase in the rate of pulse presentation can also be obtained by maintaining the pulse density in the channels substantially constant and increasing the speed of drum rotation. This is equivalent to maintaining the speed of drum rotation substantially constant and increasing the pulse density per unit of annular distance along an information channel.

The apparatus described above has one further advantage of major importance. It can be used with suitable circuitry such as that shown in FIGURE 6 to produce clock signals such as the signals illustrated at 160 in FIGURE 7. The circuitry shown in FIGURE 6 includes a "read" head such as the head 48. The "read" head 48 is connected through a suitable coupling capacitance 200 to a clipping circuit 202. The clipping circuit may be constructed in a manner similar to that described on pages 2–3 to 2–17 of "Principles of Radar" (second edition, 1946), by the staff of the Massachusetts Institute of Technology. One type of clipping circuit is also represented by the diode 90 or the diode 92 in FIGURE 8.

The output from the "read" head 48 is also supplied through a suitable coupling capacitance 204 to an inverter 206. The inverter 206 may be a conventional amplifier stage such as that formed by the tube 70 and the resistances 74, 76 and 86 in FIGURE 8. The output terminal of the inverter 206 is connected to an input terminal of a clipping circuit 208 corresponding substantially in construction and operation to the clipping circuit 202.

A mixer 210 receives at its input terminals the signals from the clipping circuits 202 and 208 and passes its output signals to the left input terminal in a monostable multivibrator 212. The monostable multivibrator 212 may be constructed in accordance with the principles described on pages 2–50 to 2–64, inclusive, of "Principles of Radar," by the M.I.T. staff, or pages 166 to 171, inclusive, of volume 19, entitled "Waveforms," of the Radiation Laboratory Series published by M.I.T. Instead of a monostable multivibrator, a blocking oscillator can also be used. This blocking oscillator may be constructed in accordance with the principles described on pages 2–82 to 2–88, inclusive, of "Principles of Radar," by the M.I.T. staff, or on pages 205 to 211, inclusive, of volume 19 entitled "Waveforms," of the Radiation Laboratory Series.

The right output terminal in the monostable multivibrator 212 is connected directly to the right input terminal in a bistable multivibrator such as the multivibrator 100 shown in FIGURES 8 and 9. A connection is also made from the right output terminal in the monostable multivibrator 212 to a delay line 214, the output signals from which are applied to the left input terminal in the bistable multivibrator 100. The delay line 214 is adapted to provide a particular delay such as that corresponding to one half of a clock cycle 160 in FIGURE 7. The reason for this will be described in detail subsequently.

The operation of the circuit shown in FIGURE 6 may be seen from a particular example. For this purpose the fragment of the channel 16 shown in FIGURE 2 is used with all of the depressed portions 24, 26, 28, 30 and 32 polarized in a single direction. With such a polarization signals are induced in the "read" head 48 in a pattern similar to that shown in the first horizontal row of FIGURE 3. This pattern of signals is repeated for convenience in the first horizontal row of FIGURE 7.

The signals shown in the first horizontal row of FIGURE 7 are converted by the clipping circuit 202 into a pattern of signals similar to that shown in the second horizontal row of FIGURE 7. As will be seen the clipping circuit 202 operates to eliminate the positive signals such as the signal 150 in the first horizontal row of FIGURE 7. In this way, only signals indicated at 220, 222, 224 and 226 remain.

The signals shown in the first horizontal row of FIGURE 7 are inverted by the inverter 206 so that a pattern of signals similar to that shown in the third horizontal column of FIGURE 7 is produced. The clipping circuit 208 then operates to eliminate the positive signals in the third horizontal row. These signals correspond in time to the signals 220, 222, 224 and 226 in the second horizontal row. In this way, the clipping circuit passes signals indicated at 228, 230, 232, 234 and 236 in the fourth horizontal column. These signals correspond in time to the positive signals eliminated by the clipping circuit 202.

The signals from the clipping circuits 202 and 208 are combined in the mixer 210, which operates to pass all of the signals. The signals passed by the mixer 210 are indicated in the fifth horizontal row of FIGURE 7. As will be seen, the mixer 210 passes a negative signal every time that either a positive signal or a negative signal is produced by the read head 48.

The signals from the mixer 210 are introduced to the left input terminal in the monostable multivibrator 212. The multivibrator 212 is so constructed that its left tube becomes cut off upon the introduction of a negative triggering signal. When the left tube in the multivibrator 212 starts to conduct, it remains conductive for a fixed length of time. This length of time can be fixed at any particular value by adjusting the values of the resistances and capacitances in the monostable multivibrator to alter the "RC" constants. This fixed length of time is greater than one half of a clock cycle for reasons which should become apparent subsequently.

By maintaining the left tube in the multivibrator 212 conductive for more than one half of a clock cycle every time that it is triggered, certain signals from the mixer 210 have no effect on the multivibrator. For example, when the left tube in the multivibrator 212 is triggered into a state of nonconductivity by the signal 230, it remains in a state of nonconductivity at the time that the signal 222 is introduced. This prevents the signal 222 from having any effect on the multivibrator 212. Similarly, the left tube in the multivibrator 212 becomes cut off upon the introduction of the signal 224 and is still cut off at the time that the signal 234 is produced. This prevents the signal 234 from triggering the multivibrator 212 into a state of nonconductivity. In this way, the multivibrator 212 and associated circuitry serves as a signal selector which is receptive only to certain signals.

As will be seen from the above discussion, the multivibrator 212 becomes locked into synchronization with the signals produced by the "read" head 48 at the position midway between the boundaries of each pulse bit. This locking action occurs at the beginning of a computation and requires at most only a few pulse bits to be effectuated. The locking action occurs because a signal is produced at a position midway in each pulse bit in accordance with the requirements of the Ferranti system of reading and recording magnetic information.

When the operation of the monostable multivibrator 212 becomes synchronized with the signals produced at an intermediate position in each pulse bit, the multivibrator 212 is no longer affected by other signals from the read head 48 such as the signals 222 and 234. In this way, the multivibrator 212 produces recurrent signals. The recurrent signals produced on the right output terminal in the multivibrator 212 are illustrated at 240 in the sixth horizontal row of FIGURE 7. As it well known, a relatively low voltage is produced on the right output terminal of a monostable multivibrator such as the multivibrator 212 when a high voltage is produced on the left output terminal of the multivibrator, and vice versa.

Although the signals 240 from the multivibrator 212 are recurrent, they are not symmetrical. In other words, in each clock cycle a high voltage is not produced on the right output terminal in the multivibrator 212 for one half of the time, and a low voltage is not produced for the other half of the time. Such a symmetrical relationship is necessary in order to obtain a proper Ferranti recording in the information channels, as by the circuit shown in FIGURE 9 and described fully above.

The delay line 214 and the bistable multivibrator 100 are included to convert the signals from the multivibrator 212 into a symmetrical relationship. As will be seen, the voltage on the right output terminal of the monostable multivibrator or flip-flop 212 changes from a high value to a low value at a time half way through each clock cycle. This negative signal is introduced to the right input terminal in the bistable multivibrator 100 to trigger the tube into a state of nonconductivity. This causes the left tube in the multivibrator 100 to become conductive such that a negative signal is produced on the left output terminal of the flip-flop. In this way a negative signal is produced on the left output terminal in the multivibrator 100 at the midpoint in each clock cycle.

The negative signals produced on the right output terminal in the monostable multivibrator 212 are delayed substantially one half of a clock cycle by the delay line 214. The signals are then introduced to the left input terminal in the bistable multivibrator 100 to trigger the tube into a state of nonconductivity. This causes the voltage on the left output terminal in the multivibrator 100 to change from a low value to a high value at the beginning of each pulse position. As a result, the clock signals 160 shown in FIGURE 7 are produced.

The use of a notched information channel and the circuitry shown in FIGURE 6 to produce clock signals has certain important advantages. It eliminates the need for any separate clock channel and the associated read head, as in the magnetic drum systems now in use. It also insures that an optimum synchronization is obtained between the clock signals and the information signals since the clock signals are derived directly from the information signals.

We claim:

1. In combination for obtaining the recording and reproduction of information by the use of paramagnetic material, a memory member having at least one information channel disposed on the periphery of the member to store a plurality of bits of information, the memory member being provided with filled and non-filled portions, the filled portions being coated with a layer of the paramagnetic material to make the portions receptive to the storage of magnetic information, the filled portions having boundaries with the non-filled portions at regular intervals along the periphery of the information channel, the non-filed portions being formed in a configuration to produce a fixed and irregular pattern of first and second digital signals in the channel to represent a particular pattern of both first and second binary values upon the magnetic polarization of the paramagnetic portions in a particular direction, a first head disposed in contiguous relationship to the information member to record magnetic signals having polarity characteristics in the non-filled portions of the channel in accordance with the phase of electrical signals introduced to the head, a second head disposed in contiguous relationship to the information member to produce electrical signals having phase characteristics in accordance with the polarity of the magnetic information recorded in the filled portions of the channel, the memory member being movable relative to the first and second heads to present successive positions in the channel for the reading and recording of magnetic information, and means responsive to the phase characteristics of the signals induced in the second head by the magnetic information in the magnetizable material in the filled portions to produce clock signals having a periodically recurring pattern.

2. In combination, an information storage member and a pair of transducers movable relative to one another, the storage member having at least one channel and a plurality of positions in the channel for the storage of information, the storage member being provided in an irregular pattern with first portions having high transducing properties and second portions having low transducing properties, the first and second portions being disposed to form common boundaries at spaced intervals for the production of recurrent signals and second signals between the recurrent signals in accordance with the pattern of stored information, the first transducing member being constructed and disposed relative to the information storage member to introduce digital information to the information member for storage and the second transducing member being constructed and disposed relative to the information storage member to receive the information from the storage member at a subsequent time, and means including signal selectors coupled electrically to the second transducing member for rejecting the signals between the recurrent signals and for using only the recurrent signals to produce clock signals.

3. In combination, a drum having at least one information channel extending in a closed loop around the periphery of the drum for the presentation of successive positions, a first head disposed in magnetic proximity to the information channel to receive electrical signals in a particular pattern and to produce a corresponding magnetic pattern in the channel, a second head disposed in magnetic proximity to the information channel to receive the magnetic pattern in the information channel and to produce a corresponding pattern of electrical signals, the drum being rotatable relative to the first and second heads, the information channel being provided with ferromagnetic portions separated by diamagnetic portions to form boundaries between the ferromagnetic and diamagnetic portions at spaced intervals along the channels for facilitating the production of the proper pattern of signals by the heads, the ferromagnetic portions having irregular spacings relative to one another and having different lengths to provide a particular and irregular pattern of first and second binary values for the different digits upon a unidirectional magnetic polarization of the ferromagnetic portions, and timing means coupled electrically to the second head for converting the irregularly timed pattern of signals produced by the second head into clock signals upon the movement past the heads of the spaced boundaries between the ferromagnetic and diamagnetic portions.

4. In combination, a drum having at least one information channel extending in a closed loop on the surface of the drum for the presentation of successive positions in the channel, a first head disposed in contiguous relationship to the drum to receive electrical signals and to produce a corresponding magnetic pattern in the drum, a second head disposed in contiguous relationship to the drum for the induction of electrical signals of first and second polarities in the head in accordance with the magnetic pattern in the drum, the drum being rotatable relative to the first and second heads, the channel being provided with a plurality of ferromagnetic portions disposed in an irregularly spaced pattern and separated from one another by diamagnetic portions to provide signals in accordance with the polarity of magnetism in the ferromagnetic portions and upon the movement past the second head of the boundaries between the ferromagnetic and diamagnetic portions, the ferromagnetic portions being provided with different lengths to produce a particular and irregular pattern of first and second binary signals of opposite polarities upon the polarization of all of the portions with magnetic flux of a particular unidirectional polarity, and means responsive to the irregularly timed signals produced by the second head for converting the signals induced in the second head into clock signals recurring at regularly spaced intervals of time.

5. In combination, a memory member having a plurality of channels and having a plurality of finite portions in each channel, first portions in the plurality in each channel having characteristics for receiving and retaining magnetic information and second portions in the plurality in each channel having charcteristics for rejecting magnetic informaiton, the first and second portions in the plurality in each channel being disposed in alternate relationship, the first portions in each channel having different lengths and irregular spacings relative to one another and the second portions for the production of a particular and irregular pattern of binary "1" and "0" signals upon the magnetic polarization of all of the portions in the same direction, a plurality of members each being disposed in contiguous relationship to a different channel to record magnetic information in the first portions in the channel as the memory member moves past the recording member, and a plurality of members each being disposed in contiguous relationship to a different channel to convert the magnetic information to corresponding electrical signals as the memory member moves past the reading member.

6. In a combination as set forth in claim 5, the plurality of first and second portions in each channel being disposed relative to one another to produce a fixed pattern of signals representing particular information upon the recording of unidirectional magnetic flux in the first portions of the channel.

7. In combination, a plurality of recording members for receiving electrical signals and for converting the electrical signals into corresponding magnetic signals, a plurality of reading members for receiving magnetic signals and for converting the magnetic signals into corresponding electrical signals, and a member having a plurality of channels each magnetically isolated from the other channels and each disposed in contiguous relationship to at least a different one of the recording means and a different one of the receiving means, each channel having a plurality of magnetically receptive and non-receptive portions disposed in staggered relationship to one another in the channel, the magnetically receptive portions in each channel being disposed relative to their associated recording members to produce a synchronization in the recording of magnetic information in the channels and being disposed relative to their associated reading members to produce a synchronization in the reading of the magnetic information in the channels, the magnetically receptive portions in each channel having different lengths and different spacings relative to one another and relative to the magnetically non-receptive portions to produce a particular and irregular pattern of binary signals of first and second polarities upon a unidirectional magnetic polarization of the portions, the magnetically receptive and non-receptive portions in each channel being disposed to provide signal indications in the associated reading member in representation of particular information upon a unidirectional magnetic polarization of the receptive portions in the channel.

8. In combination, a member movable in a closed loop and having at least one information channel on its periphery and having a plurality of magnetically receptive and magnetically rejecting portions disposed along the channel with boundaries between the magnetically accepting and magnetically rejecting portions being provided at periodically spaced intervals and at particular additional positions between the periodic spacings to provide an irregular pattern of the magnetically accepting and magnetically rejecting portions, a magnetically responsive head disposed relative to the information channel to produce electrical signals of first and second polarities in accordance with the magnetic information recorded in the magnetically receptive portions of the information channel, first means responsive to the signals from the head for passing only the electrical signals of first polarity from the head, second means responsive to the signals from the head for passing only the signals of second polarity from the head and for converting these signals to signals of first polarity, means responsive to the signals from the first and second means for mixing the signals of first polarity from the first and second means to produce signals of first polarity at the times of production of signals of first or second polarity by the head, triggering means responsive to the signals from the mixing means for providing a first state of operation for a particular period greater than one-half of the time required to traverse the periodically spaced intervals but less than the full time required to traverse the periodically spaced intervals and for returning to a second state of operation at the end of the particular period, and means responsive to the first state of operation of the triggering means to produce clock signals coordinated with the presentation of the periodically spaced intervals in the information channel.

9. In combination, a memory member movable in a closed loop and having at least one information channel and having a plurality of finite portions in each channel, first portions in the plurality having characteristics for receiving and retaining magnetic information and second portions in the plurality having characteristics for rejecting magnetic information, the boundaries of the first portions being separated from the boundaries of the second portions by a particular length and also at certain positions by lengths intermediate the particular length to provide an irregular spacing of the first and second portions, some of the first portions having the particular length and others having the intermediate length, a head responsive to the polarities of the magnetic information recorded in the first portions to produce electrical signals having first and second polarities, a first clipping circuit electrically coupled to the head to pass only the signals of first polarity from the head, a second clipping circuit electrically coupled to the head to pass only the signals of second polarity from the head, an inverter electrically coupled to the second clipping circuit to change the signals of second polarity to signals of first polarity, a mixer responsive to the signals from the inverter and from the first clipping circuit for mixing the signals of first polarity from the inverter and from the first clipping circuit, means electrically coupled to the mixer for producing first signals in response to signals from the mixer but having characteristics for being rendered disabled to signals from the mixer after the production of each of such first signals for a time period less than that corresponding to the particular length but greater than that corresponding to the intermediate length, and means responsive to the first signals from the last mentioned means for producing clock signals synchronized with the presentation of successive particular lengths in the information channel.

References Cited in the file of this patent

UNITED STATES PATENTS 2,609,143 Stibitz ---------------- Sept. 2, 1952
2,797,402 Duffey et al. ----------- June 25, 1957